United States Patent [19]

Buchanan

[11] Patent Number: 4,477,990
[45] Date of Patent: Oct. 23, 1984

[54] PICTURE FRAME

[75] Inventor: Charles W. Buchanan, Scottsdale, Ariz.

[73] Assignee: William Sornborger, Los Angeles, Calif.

[21] Appl. No.: 386,219

[22] Filed: Jun. 8, 1982

[51] Int. Cl.³ .......................... G09F 1/12; A47G 1/06
[52] U.S. Cl. ........................................ 40/155; 40/152; 403/403
[58] Field of Search ................ 40/152, 152.1, 154, 40/155, 209; D6/246; 403/400, 401, 403; 46/16, 23, 27, 29

[56] References Cited

U.S. PATENT DOCUMENTS

| | | | |
|---|---|---|---|
| 899,556 | 9/1908 | Parker | 40/155 |
| 996,915 | 7/1911 | Engelmohr | 40/155 |
| 1,064,450 | 6/1913 | Davison | 40/155 |
| 1,338,258 | 4/1920 | Smith | 40/155 |
| 1,446,367 | 2/1923 | Zelan | 40/155 |
| 1,558,987 | 10/1925 | Kallscheuer | 40/155 |
| 2,442,967 | 6/1948 | Barasch et al. | 40/155 |
| 2,776,508 | 1/1957 | Hutson | 40/155 |
| 2,920,768 | 1/1960 | Halip | 40/155 |
| 3,034,612 | 5/1962 | Jourdan | 40/155 |
| 3,936,968 | 2/1976 | Gilbert | 40/155 |
| 4,356,648 | 11/1982 | Beaulieu | 40/155 |

FOREIGN PATENT DOCUMENTS 424661  5/1911  France .................................. 40/155

Primary Examiner—Gene Mancene
Assistant Examiner—James R. Hakomaki
Attorney, Agent, or Firm—Don J. Flickinger

[57] ABSTRACT

A do-it-yourself picture frame includes a plurality of edge members, each having a circular or slot-like aperture proximate each end thereof, joined by a plurality of corner members. Each corner member includes first and second perpendicular channels for receiving the ends of adjacent edge members. Each channel is provided with a stop plate against which an end of an edge member may abut and an internally threaded projection which extends into an aperture in an edge member. A screw threadably engages the projection to secure the edge member in its channel.

13 Claims, 13 Drawing Figures

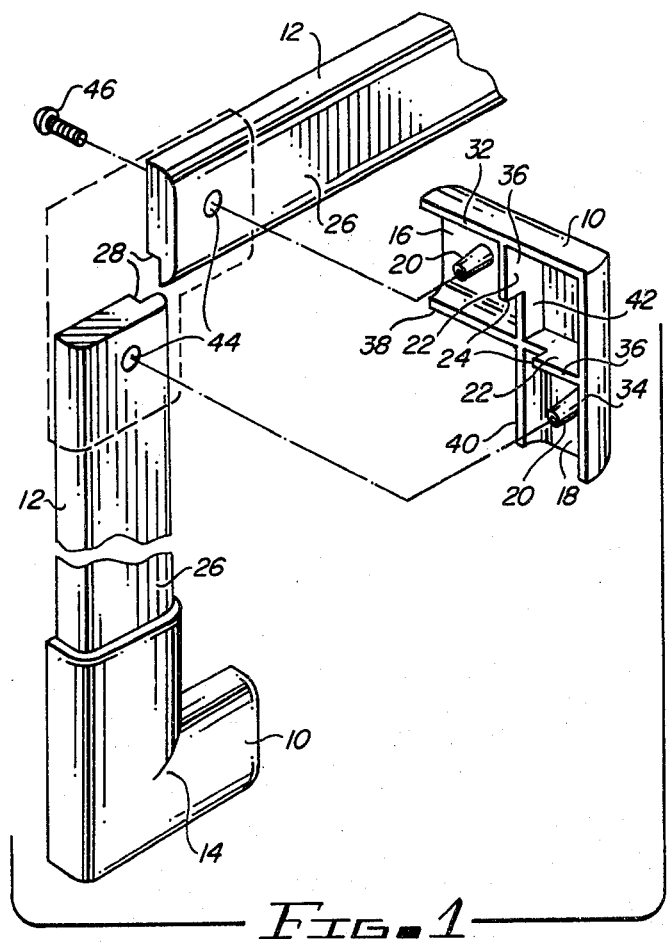
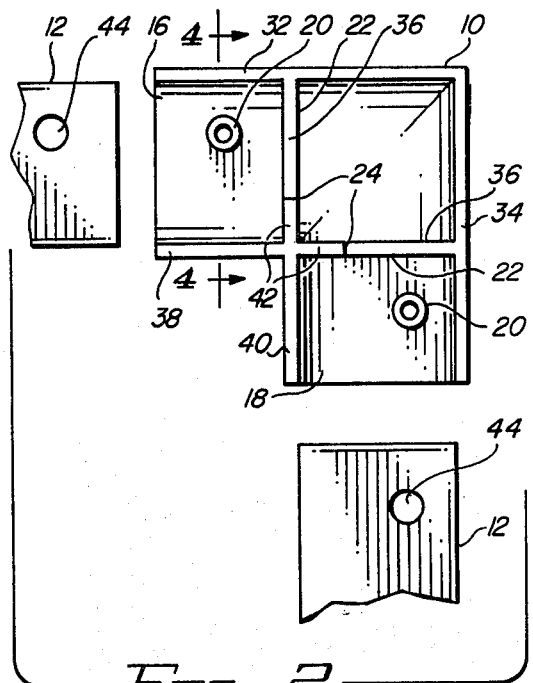
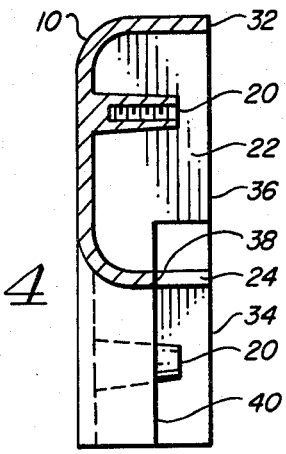
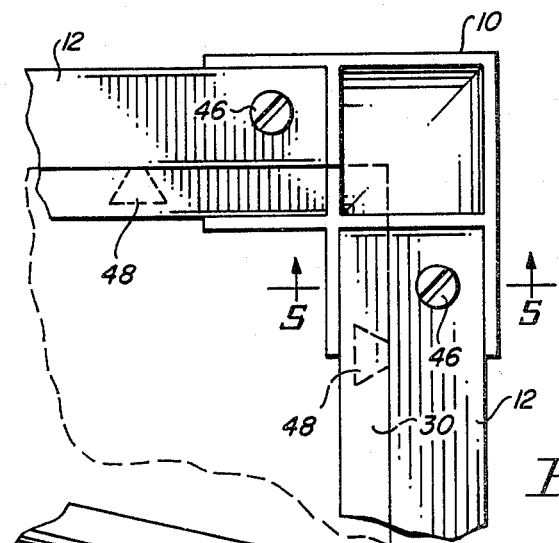
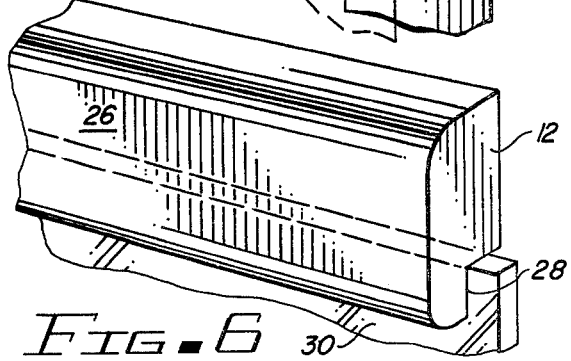
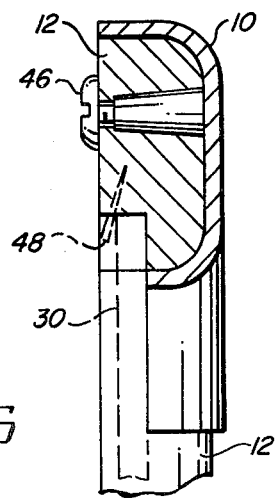

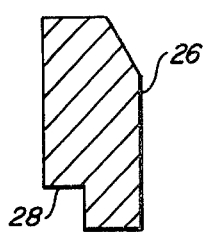
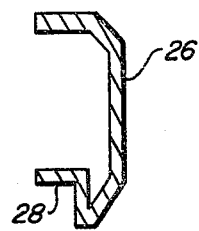
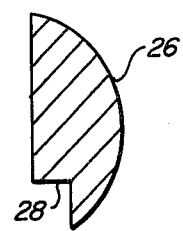
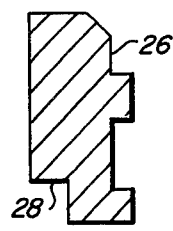
FIG.7A  FIG.7B  FIG.7C  FIG.7D
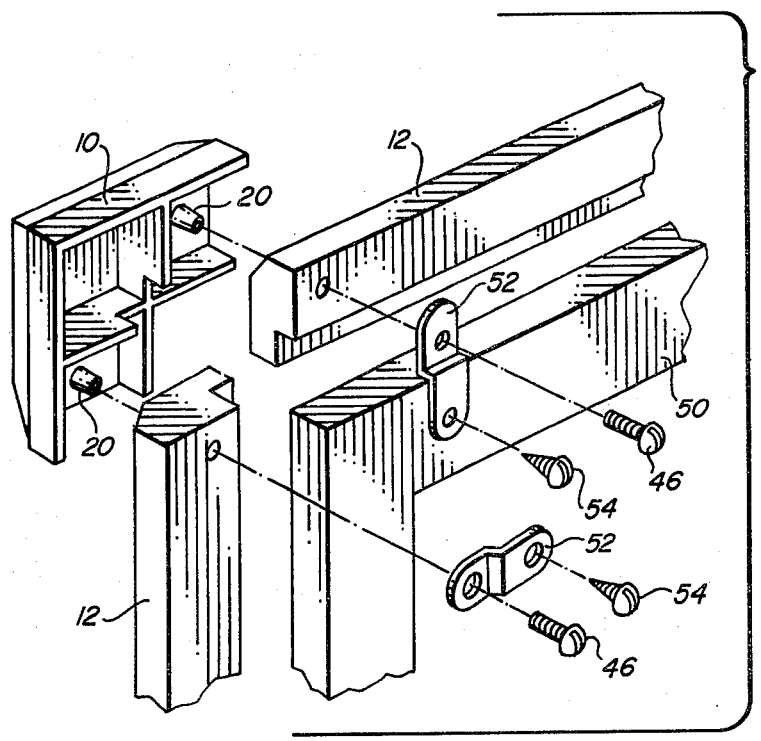
FIG.8
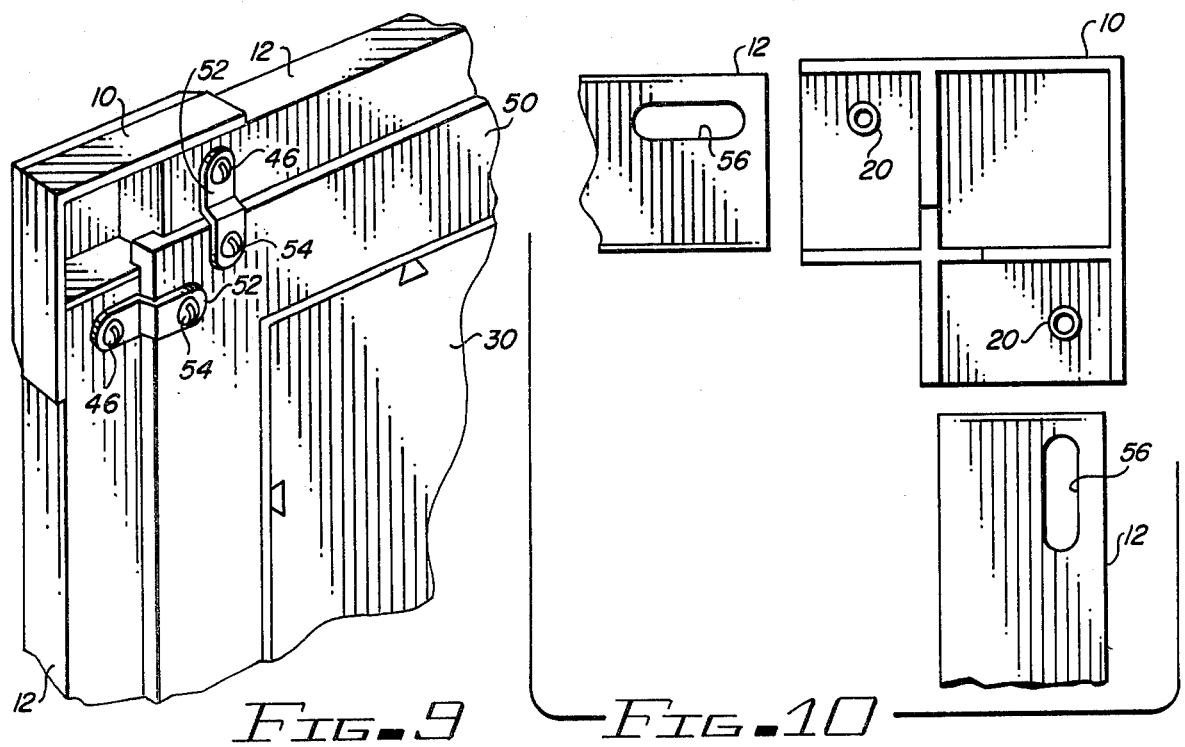
FIG.9  FIG.10

PICTURE FRAME

FIELD OF THE INVENTION

This invention relates generally to picture frames and, more particularly, to do-it-yourself picture frames requiring no mitered edges.

PRIOR ART

It is well known that picture frames may be purchased in any one of a number of standard sizes for framing paintings, photographs, certificates, and the like. The edge members of such frames almost always have mitered edges.

It is also well known that picture frames may be custombuilt to accommodate pictures of odd sizes. This requires selection of the frame material and pattern and any desired matting. Then, the edges are almost always mitered so that the frame components may be joined together to form the desired frame. Material cost and labor fees generally become significant. Furthermore, if there is the slightest error in measurement, the resulting frame may be unable to accommodate the picture for which it was intended or the mitered edges may not fit adequately resulting in a frame which is displeasing to the eye.

SUMMARY OF THE INVENTION

It is an object of the present invention to provide an improved picture frame.

It is a further object of the present invention to provide an improved picture frame which does not require mitered edges.

It is a still further object of the present invention to provide decorative picture frame components which may be selected according to taste and from which a picture frame may be easily and economically constructed without mitering.

It is yet another object of the present invention to provide decorative picture frame components which, when coupled together, permit a certain amount of dimensional adjustment so as to accommodate pictures which are not exactly standard sizes.

According to a broad aspect of the invention, there is provided a picture frame comprising: a plurality of edge members each having an aperture therethrough proximate each end thereof; and a plurality of corner members for coupling said plurality of edge members together to form said frame, each of said corner members comprising: first and second channels perpendicular to each other for receiving ends of adjacent edge members; and means coupled to each of said channels for passing through said apertures to secure said adjacent edge members to one of said corner members.

According to a further aspect of the invention there is provided a corner bracket for securing edge members of a picture frame together, each of said edge members having an aperture proximate each end thereof, said corner bracket comprising: first and second channels perpendicular to each other for receiving ends of adjacent edge members; and an internally threaded projection within each of said first and second channels for extending into the apertures in adjacent ends of adjacent edge members.

BRIEF DESCRIPTION OF THE DRAWINGS

The above and other objects, features and advantages of the present invention will be better understood from the following detailed description taken in conjunction with the accompnaying drawings, in which:

FIG. 1 is a partially exploded front view of the inventive picture frame;

FIG. 2 is a rear view of a corner bracket and first and second edge members of the inventive picture frame;

FIG. 3 is a rear view of the inventive picture frame housing a picture;

FIG. 4 is a cross-sectional view of a picture frame corner bracket according to the present invention taken along the line 4—4 in FIG. 2;

FIG. 5 is a cross-sectional view of a picture frame corner bracket and edge member according to the present invention taken along the line 5—5 in FIG. 3;

FIG. 6 illustrates how a picture frame edge member, according to the present invention, mates with and accommodates a picture, photograph, etc;

FIGS. 7A–7D illustrate, in cross-section, a variety of picture frame edge members according to the present invention;

FIGS. 8 and 9 are isometric views illustrating how the inventive picture frame may accommodate an inner frame of matting; and FIG. 10 illustrates an alternate embodiment which permits adjustment of the side lengths of the picture frame.

DESCRIPTION OF THE PREFERRED EMBODIMENTS

FIGS. 1 and 2 illustrate the components which comprise the inventive picture frame. These include four corner brackets 10 and four edge members 12. Corner brackets 10 may be made of metal, plastic, wood or any other material which will provide the required support. Furthermore the front face 14 of corner bracket 10 may exhibit a variety of patterns or textures so as to provide a customer with a wide selection. Similarly, edge members 12 may be made of wood, metal, or any other material which exhibits the required rigidity. Also, edge members would be made available in a variety of lengths so that different size frames could be assembled to accommodate pictures of different sizes.

Each corner bracket 10 is equipped with first and second concave receiving channels 16 and 19, each of which is provided with a cylindrical internally threaded projection 20 and a stepped stop plate 22 having a step 24. Each channel 16 and 19 is contoured so as to receive edge members 12, and each has a longitudinal axis which is perpendicular to that of the other.

FIG. 4 is a cross-sectional view of the corner bracket 10 shown in FIG. 2 taken along line 4—4. It should be clear from FIGS. 1, 2 and 4 that edges 32 and 34 are co-planar with the upper edge 36 of stop plate 22 while edges 38 and 40 are co-planar with the lower edge 42 of stop plate 22.

Edge members 12 exhibit a variety of front surfaces 26 as is shown in cross-section in FIGS. 7A–7D where the edge members of FIGS. 7A, 7C, and 7D are wood and that of FIG. 7B is metal (e.g., aluminum). It is only necessary that each edge member be equipped with a corner lip 28 to receive and position a picture 30 to be framed as is shown more clearly in FIG. 6.

As is shown in FIGS. 1 and 2, each edge member 12 has an aperture 44 near each end thereof. Each edge member is then positioned within corner brackets such that projections 20, in adjacent corner members, enter apertures 44 at each end of an edge member. Screws 46 are then threaded into projections 20 from the rear of the edge member to secure the edge members within the corner brackets.

After all edge members are secured within the corner brackets, picture 30 may be positioned such that it rests on corner lip 28 of edge members 12 and on the lower edges 42 of stop plates 22 between steps 24 as is shown in FIG. 3. Picture 30 may be secured in place by nails 48 or the like as is shown in FIG. 3 and in FIG. 5 which is a cross-sectional view taken along line 5—5 in FIG. 3.

FIGS. 8 and 9 illustrate how a matting 50 may be received by the assembled frame. It also would rest on corner lip 28 of edge members 12 and lower edges 42 of stop plates 22. Screws 46 would then pass through one end of bracket 52 prior to entering internally threaded projection 22. A second screw 54 passes through a second end of bracket 52 and into matting member 50 as to secure the matting within the frame.

To provide a certain degree of flexibility and permit adjustments of the side lengths of the frame, apertures 44, at each end of the edge members 12, may be replaced by slots 56 as is shown in FIG. 10. The slots 56 are then placed over projections 20 in corner brackets 10 so as to be slidably coupled to the corner brackets. The side lengths of the frame may then be adjusted to accommodate irregularities in the dimensions of the picture to be framed prior to tightening screws 46.

The above described picture frame and components require no mitered edges. A variety of frames may be constructed from a variety of corner brackets and edge members. Furthermore, one embodiment provides for easy adjustment of frame dimensions within a certain range to accommodate dimensional irregularities in the picture to be framed.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. A picture frame comprising:
   A. a plurality of edge members each having an aperture proximate each end thereof:
   B. a plurality of corner members for coupling said plurality of edge members together to form said frame, each of said corner members comprising:
      1. first and second channels perpendicular to each other for receiving therein ends of adjacent edge members; and
      2. an internally threaded projection within each of said channels for passing through said apertures to secure said adjacent edge members to one of said corner members; and
   C. screw means for threadably engaging said internally threaded projection from a second direction opposite said first direction.

2. A picture frame according to claim 1 wherein each channel is terminated by a stop plate having a step therein such that said stop plate has an upper edge and a lower edge.

3. A picture frame according to claim 2 wherein each corner member comprises an inner edge and an outer edge which form first and second sidewalls of each of said channels.

4. A picture frame according to claim 3 wherein said outer edge is co-planar with and contiguous with the upper edge of said stop plate and said inner edge is co-planar with and continuous with the lower edge of said stop plate.

5. A picture frame according to claim 4 wherein each of said edge members is equipped with a lip for supporting a picture to be framed.

6. A picture frame according to claim 5 wherein said aperture is in the form of a slot to permit lateral movement of said edge member in said channel prior to tightening said screw means.

7. A picture frame according to claim 6 wherein said corner members are metallic.

8. A picture frame according to claim 7 wherein said edge members are metallic.

9. A picture frame according to claim 7 wherein said edge members are wooden.

10. A corner bracket for securing edge members of a picture frame together, each of said edge members having an aperture proximate each end thereof, said corner bracket comprising:
   first and second channels perpendicular to each other for receiving ends of adjacent edge members; and
   an internally threaded projection within each of said first and second channels for extending into the apertures in adjacent ends of adjacent edge members.

11. A corner bracket according to claim 10 further comprising a stop plate in each of said first and second channels against which said adjacent ends may abut.

12. A corner bracket according to claim 11 wherein said stop plate has a step therein forming an upper edge and a lower edge.

13. A corner bracket according to claim 12 wherein each channel is formed by an inner side wall and an outer side wall, said inner side wall having an edge which is contiguous with said lower edge and said outer side wall having an edge which is contiguous with said upper edge.

* * * * *